3,579,496
SELECTIVE EXTRACTION PROCESS PRODUCING PROTEIN ISOLATES FROM OILSEED MEALS USING WATER OR DIVALENT METAL SALTS AS EXTRACTING AGENTS
Wilda H. Martinez and Leah C. Berardi, New Orleans, La., assignors to the United States of America as represented by the Secretary of Agriculture
Filed July 17, 1969, Ser. No. 842,576
Int. Cl. A23j 1/14; C07g 7/00
U.S. Cl. 260—123.5          26 Claims

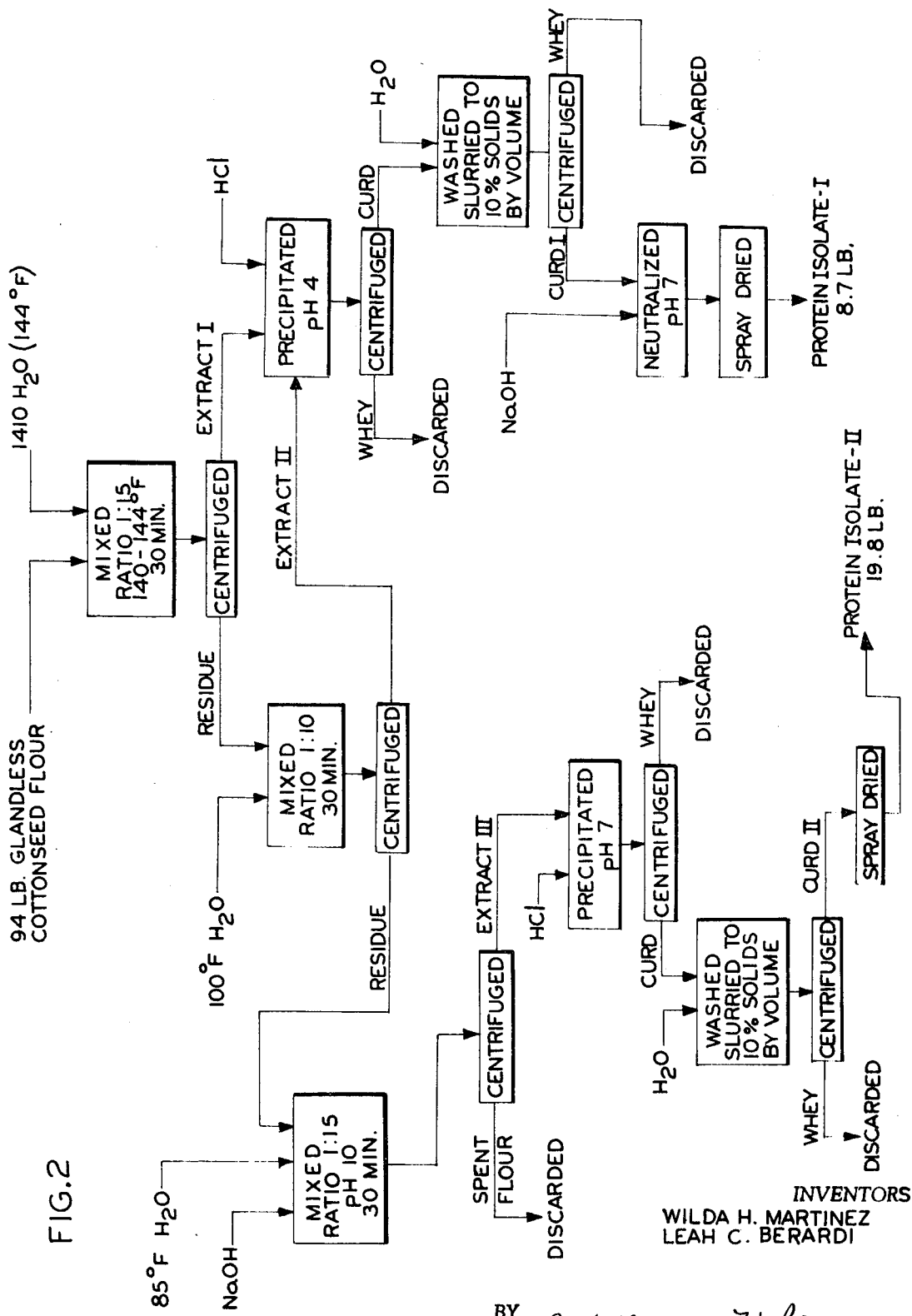

ABSTRACT OF THE DISCLOSURE

A process for extracting selectively protein fractions from oilseed flour which process comprises a preliminary extraction with water or a dilute (.008 M) polyvalent cationic salt solution and subsequently with aqueous base (.015 N sodium hydroxide).

Figure 1:
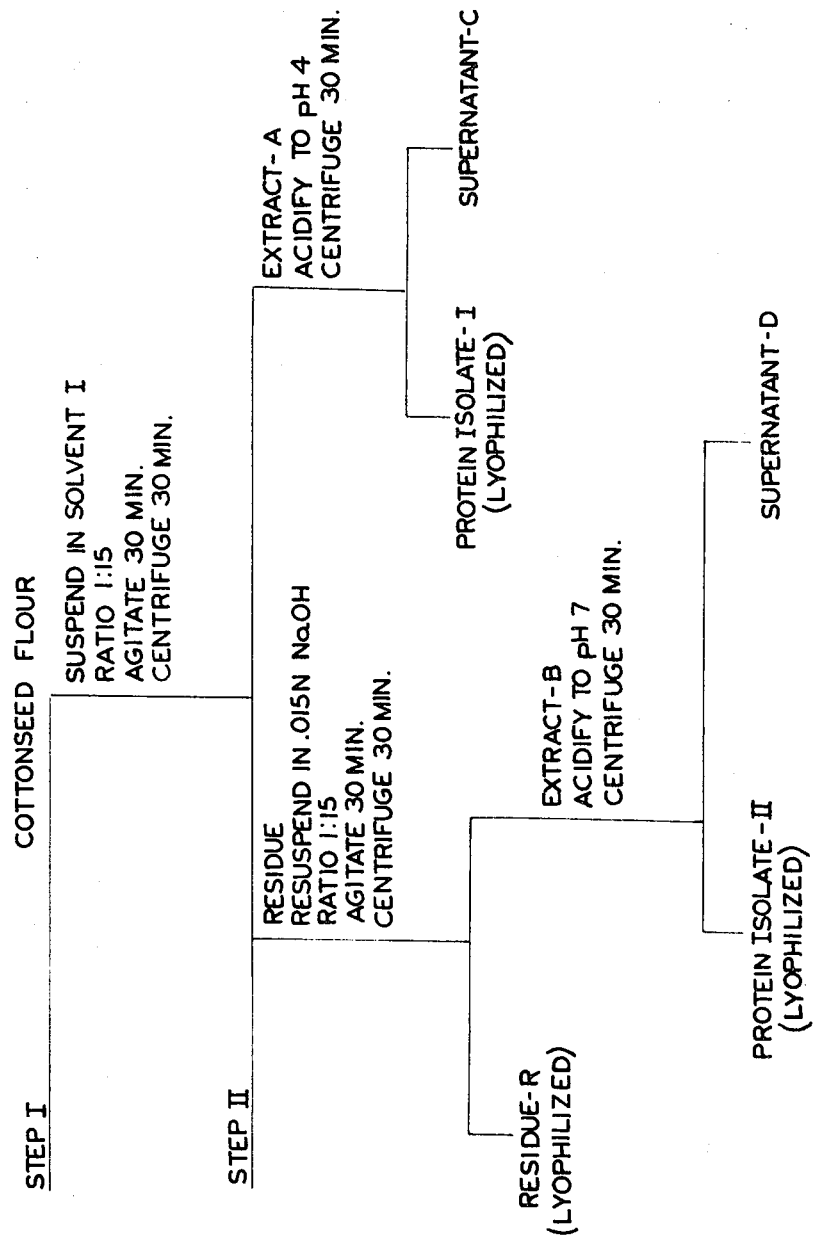

The protein isolates thus extracted differ in composition, average molecular weight and solubility characteristics. With certain oilseeds, the disclosed process provides for the recovery of somewhat more of the total nitrogen from the flour being processed and for an improved flavor and color in the major isolate than does a conventional single-step alkaline extraction process.

---

A non-exclusive, irrevocable, royalty-free license in the invention herein described, throughout the world for all purposes of the United States Government, with the power to grant sublicenses for such purposes, is hereby granted to the Government of the United States of America.

The process of this invention comprises, in general, an extraction procedure for the selective separation of the relatively low and high molecular weight proteins from essentially undenatured oilseed flours. Separation is based on the solubility of the proteins and the cytology of the oilseed. Undenatured oilseed flour, according to the process, is extracted with $H_2O$ or a dilute aqueous polyvalent cationic salt solution and subsequently with aqueous base. The separate extractions provide for the separation of primarily the low molecular weight proteins precipitable within the range of pH 3.8–4.2 (Isolate-I) and the high molecular weight, alkali-soluble proteins precipitable over a pH range which varies with the particular oilseed meal being processed (Isolate-II). With certain oilseeds, Isolate-I contains as much as 17% of the total N of the flour. Isolate-II can contain, depending upon the oilseed, from about 45% to 72% of the total nitrogen. The isolates differ in composition, average molecular weight, and in solubility characteristics. With certain oilseeds, the two isolates account for slightly more of the total N of the flour than does an isolate obtained from a single-step, alkaline extraction. In addition, the color and flavor of the major isolate (Isolate-II) is improved.

The quality and yields of the isolates obtained with the double extraction process are relatively insensitive to time of extraction beyond 30 minutes, to extraction temperature within the range of about 25° to 75° C., type of acid used for precipitation, or extraction ratio (flour to solvent) within the range of about 1:20 and 1:10. However, in the specific case of cottonseed an increasing extraction temperature increases gland rupture and the dispersion of pigments in the water extract. The increased temperature and dispersion subsequently results in an increased content of total and bound (total gossypol minus free gossypol) gossypol in the water extracted fraction and a decreased content of free and total gossypol in the alkali-extracted fraction.

The oilseed kernel is composed primarily of cotyledonous tissue and contains varying amounts of protein. The major portion of this protein is located in the protein bodies or aleurone grains which fill the cells of the cotyledons. The protein bodies range in size from 1 to 20 microns and each is surrounded by a unit membrane. In some oilseeds, embedded within the matrix of the protein body is another particle called the globoid. Globoids are the storage sites of the phytin of the seed and contain certain metal ions in addition to the inositol phosphate. Protein bodies remain intact during defatting, grinding, and appropriate extraction. With certain oilseeds such as cottonseed and sunflower, the protein bodies do not rupture on suspension in water. Extended suspension, beyond several hours will cause the protein bodies to swell and perhaps rupture but will not bring about solubilization of the major storage or protein body proteins. With other oilseeds, such as soybean and peanut, the protein bodies do rupture on suspension in water permitting dispersion of the proteins. The use of dilute polyvalent cationic salt solutions with this type of oilseed stabilizes the protein bodies and permits selective extraction. Such dilute divalent salt solutions can be considered "isotonic" salt solution for the protein bodies of the seed.

The proteins of oilseeds in general can be divided into two groups, water or dilute, polyvalent cationic salt-soluble and water or dilute, polyvalent cationic salt-insoluble. The water or dilute salt-soluble proteins are usually many in number, relatively high in electrophoretic mobility and relatively low in molecular weight. The water or dilute salt-insoluble (protein body) proteins are few in number, relatively low in electrophoretic mobility and relatively high in molecular weight.

Conventional methods for the preparation of oilseed protein isolates have utilized a single-step extraction of defatted oilseed with aqueous alkaline or high molarity salt solutions. These prior art preparations contained both the high and low molecular weight proteins in a single isolate. The process of the instant invention provides selective extraction of the low molecular weight and high molecular weight proteins and produces two isolates of different composition and properties.

The methods and procedures set down below more precisely describe the operational details of the process which is the subject of this invention.

COTTONSEED FLOURS

*Glandless.*—Acala 442 or Gregg 25V glandless cottonseed were dehulled and freed of the major portion of hulls and fines. The whole and cracked meats were flaked to a thickness of .010 inch, batch extracted with hexane and air desolventized for a minimum of 16 hours at ambient conditions. Residual solvent was removed by nitrogen spraging under 24" of vacuum with no heat for one hour.

*Glanded cottonseed.*—The high gossypol, glanded flour was prepared from prime glanded seed by the same procedure with only minor exceptions. Prior to flaking at .010 to .012 inch, the whole and cracked meats were brought to 180° F. within 15 min., then cooled at ambient temperature for 15 min. Residual solvent was removed in the same manner but at a maximum temperature of 170° F.

The low gossypol, glanded flour was prepared by the liquid cyclone procedure.

*Soybean.*—The soybean meal was a commercial soybean meal which had a Protein Dispersible Index of 90.

*Peanut.*—Blanched peanuts were deskinned, flaked from .010 to .012 inch, hexane extracted and air desolventized.

*Sunflower.*—Peredovick variety sunflower seeds were dehulled and screened to remove the major portion of the hulls. The meats were flaked to about .012 inch, hexane extracted and air desolventized.

Portions of all meals were ground to flours in the Alpine Kolloplex mill 160Z.

TABLE I.—COMPOSITION OF OILSEED FLOURS

| Flour | Composition, percent | | | | | |
|---|---|---|---|---|---|---|
| | Nitrogen | Moisture | Lipid | Crude fiber | Gossypol Free | Gossypol Total |
| Cottonseed glandless | 9.48 | 9.90 | 0.40 | 2.7 | | |
| Glanded high gossypol | 9.00 | 8.70 | 1.20 | 3.1 | 1.01 | 1.35 |
| Low gossypol | 11.03 | 1.00 | 0.64 | 2.6 | 0.07 | 0.25 |
| Peanut | 9.26 | 6.70 | 0.35 | 3.4 | | |
| Soybean | 8.19 | 7.10 | 1.25 | 3.0 | | |
| Sunflower | 8.39 | 10.30 | 1.15 | 6.3 | | |

METHODS OF ANALYSIS

The macro Kjeldahl procedure was used for nitrogen determination. Moisture, lipid, gossypol, crude fiber, ash and total sugar determinations were carried out according to standard procedures (A.O.A.C., 1960; A.O.C.S., 1964). Phosphorus, calcium and magnesium contents were determined by X-ray fluorescence (Mitcham et al., 1965).

Ultracentrifugation. — Ultracentrifuge patterns were obtained with a Spinco Model E ultracentrifuge at 59,780× g, C., and a bar angle of 60°. Either the standard cell or both the standard cell and the 1° wedge quartz cell were used with the analytical rotor.

Electrophoresis. — Elecertophoretic patterns were obtained with the E–C Vertical electrophoresis equipment and a 5% polyacrylamide gel set with the apppropriate buffer and catalyst.

Nitrogen precipitation curves.—Fifty ml. aliquots of a 1% solution of the dry protein isolate in .015 N NaOH were titrated to specific pH values with .3 N HCl. Sufficient distilled water was added to give a final volume of 60 ml. with HCl or without (control). Each aliquot was then centrifuged for 30 minutes at 7,800× g and 10° C. The supernatant was decanted, filtered, and analyzed for nitrogen.

Two-step extraction procedure.—FIG. 1 depicts the extraction procedure. Distilled water, .008 M calcium chloride, .008 M calcium acetate, .008 M magnesium chloride, .008 M magnesium sulfate or other salts of polyvalent cations can be used as Solvent I. See Table II for condensed data of the use of various solutions as Solvent I.

Extractions were normally conducted at a ratio of 1 g. of flour per 15 ml. of solvent. Permutations of 1:15, 1:10, and 1:10, 1:10 in Steps I and II, respectively, were also investigated with cottonseed, but as noted above were without significant effect. The ratio in Step II is based upon the original weight of flour. Step I was conducted at temperatures of 25° and 75° C. and within this range temperature was found to exert little, if any effect. Extracts were centrifuged at 7,800× g, decanted and filtered through No. 4 filter paper to remove any small particles dislodged during decentation. Extracts were stirred constantly during acidification with 1 N HCl. Isolates were centrifuged at 7,800× g.

The pH of maximum precipitation was determined by titrating aliquots of the extracts related to specific pH values, centrifuging under the appropriate conditions of isolation and determining the nitrogen content of the supernatant.

FIG. 2 sets forth the flow diagram and certain pertinent data which relates to the process as employed in a pilot plant operation with cottonseed. A feed rate of approximately 250 gallons per hour to an industrial type centrifuge (automatic discharge) was used for all centrifugal operations. Isolates were dried in a spray dryer at an inlet temperature of 250 F. and an exhaust tempertaure of 180 to 185° F. See Table III for condensed data.

TABLE III.—PILOT PLANT PRODUCTION OF PROTEIN ISOLATES FROM COTTONSEED FLOUR

| Glandless cottonseed | Wt., lb. | Percent of total wt. | Percent of total N | N | P | Moisture | Crude fiber | Lipid | Ash | Bulk density, g./ml. |
|---|---|---|---|---|---|---|---|---|---|---|
| Flour | 94.0 | 100 | 100 | 9.48 | 2.10 | 9.9 | 2.7 | 0.4 | 7.25 | |
| Isolate-I | 8.7 | 9.3 | 12.4 | 12.59 | 2.54 | 4.2 | 0.7 | 1.3 | 0.88 | 0.41 |
| Isolate-II | 19.8 | 21.1 | 37.1 | 16.68 | 0.25 | 4.3 | 0.4 | 0.1 | 0.90 | 0.66 |

As noted above, either water or solutions containing an "isotonic" concentration of polyvalent cationic salt such as .008 M calcium chloride, calcium acetate, magnesium chloride or magnesium sulfate can be used to extract the relative low molecular weight, non-protein-body proteins. The high molecular weight protein-body proteins are solubilized by reextraction of the water extracted flour with alkali (.015 N NaOH).

If the criteria of protein acceptance is nitrogen content, then the polyvalent salt, dilute alkali procedure is the preferred process. If both recovery of total nitrogen and total weight of recovered nitrogen are important, then the water, dilute alkali procedure is the preferred process with oilseeds such as cottonseed and sunflower.

Confirmation of the type of proteins solubilized and isolated by the various procedures was established by ultracentrifuge and electrophoretic patterns. Both the water and the polyvalent cationic salt extracts from each of these extractions showed a multicomponent system containing little if any of the major high molecular weight protein components of the seed. Solubilization of both groups of components is achieved with a single-step alkaline extraction.

TABLE II.—USE OF VARIOUS SOLUTIONS AS SOLVENT I

| Oilseed flour | Step-1 Solvent | Step-1 Percent of Total N | Step-2 Solvent | Step-2 Percent of Total N | Product | Percent of Total N | Composition Nitrogen | Composition Phosphorus | Composition Calcium | Composition Magnesium |
|---|---|---|---|---|---|---|---|---|---|---|
| Cottonseed | H₂O | 25.9 | .015 N NaOH | 65.7 | Isolate I | 16.0 | 13.68 | 3.22 | 0.01 | |
| | | | | | Isolate II | 55.1 | 15.93 | 0.48 | 0.02 | |
| | .008 M CaCl₂ | 20.0 | .015 N NaOH | 56.6 | Isolate I | 5.6 | 14.73 | | | |
| | | | | | Isolate II | 51.1 | 16.27 | 0.30 | 0.04 | |
| | .008 M MgSO₄ | 21.9 | .015 N NaOH | 66.6 | Isolate I | 10.0 | 13.65 | 2.14 | | 0.38 |
| | | | | | Isolate II | 54.2 | 15.54 | 0.49 | | 0.31 |
| Soybean | .008 M CaCl₂ | 14.0 | .015 N NaOH | 54.0 | Isolate I | 6.0 | 12.98 | 1.28 | 0.08 | |
| | | | | | Isolate II | 50.0 | 15.32 | 0.96 | 0.28 | |
| | .008 M MgCl₂ | 15.0 | .015 N NaOH | 55.2 | Isolate I | 6.0 | 12.01 | 1.31 | | 0.28 |
| | | | | | Isolate II | 49.1 | 14.82 | 0.61 | | 0.10 |

Optimum protein precipitation cannot necessarily be equated with optimum nitrogen content of the isolates. However, since the efficiency of precipitation decreased appreciably at pH values lower than pH 4, pH 4 was selected as optimum for precipitation of the relatively low molecular weight proteins from the water or salt extract. With cottonseed, at pH 4.1, 66% of the extracted nitrogen was precipitated from the water extract. Both mineral acid and the organic acid were equally effective for precipitation. The area of maximum precipitation for the high molecular weight proteins from the alkaline extract (Step II) varied with the particular oilseed and extended from pH 7 to pH 5. At the appropriate pH more than 90% of the extracted nitrogen was precipitated.

Single-step extraction procedure.—The oilseed flour was extracted at a 1:15 ratio with .027 N NaOH or, in certain instances, with water at 25° C. for purposes of comparison. Acidification with 1 N HCl to the appropriate pH produced maximum yield of the isolate. All other conditions of time, agitation, and centrifugation were the same as those used in the preferred process of the invention.

Approximately the same amount of nitrogen was extracted by both single-step and two-step procedures; slightly more of the total nitrogen was recovered in the isolates from the double water-dilute alkali extraction process. For cottonseed, this procedure gave 69.7% from the two-step and 66.6% of the total nitrogen from the single step. However, although water-dilute alkali procedure with soybean and peanut did provide a higher yield of total nitrogen, it did not provide selective extraction. Therefore with oilseed flours such as soybean and peanut the preferred procedure for selective extraction is the two-step, dilute polyvalent cationic salt-dilute alkali process. With the selective, two-step procedure the major isolate (Isolate-II) in all cases was blander in flavor than the isolate from the single-step procedure. With all oilseeds except cottonseed the color of the major isolate was lighter than that of the isolate from the single-step procedure. With cottonseed the color was essentially the same. See Tables IV, V, VI and VII for condensed comparative data on the two procedures.

TABLE IV.—COMPARISON OF SINGLE AND TWO-STEP EXTRACTION PROCEDURE FOR COTTONSEED FLOUR

| Procedure | Extract pH | Percent of total N extracted | pH of precipitation | Isolate N, percent | P, percent | Percent of total N | Percent of total wt. |
|---|---|---|---|---|---|---|---|
| Single step:[1][2] | | | | | | | |
| .027 N NaOH | 9.85 | 87.1 | 5.0 | 14.97 | 0.87 | 66.6 | 41.0 |
| Two-step:[1][3] | | | | | | | |
| Step I, H₂O | 6.67 | 26.7 | 4.0 | 13.23 | 3.47 | 17.4 | 12.3 |
| Step II, .015 N NaOH | 9.69 | 59.7 | 7.9 | 16.15 | 0.47 | 52.3 | 30.1 |

[1] Extraction conditions: Ratio, 1:15; time, 30 min.; temperature, 25° C.; glandless flour.
[2] Average of 4 trials.
[3] Average of 6 trials from Acala and Gregg 25V glandless flours.

TABLE V.—COMPARISON OF SINGLE AND TWO STEP EXTRACTION PROCEDURE FOR PEANUT FLOUR

| Method | Extract pH | Extract Percent of total N | Precipitate pH | Precipitate Percent of total N | Effluent Percent | Effluent Percent of total N |
|---|---|---|---|---|---|---|
| Single step: (I) .027 N NaOH | 10.4 | 78 | 4.5 | 67 | 1.00 | 10 |
| Two step: | | | | | | |
| (I) H₂O | 6.7 | 68 | 4.5 | 57 | 0.37 | 5 |
| (II) .015 N NaOH | 10.6 | 26 | 6.0 | 22 | 0.14 | 2 |
| (I) .008 M CaCl₂ | 6.3 | 7 | 4.0 | 1 | 0.40 | 6 |
| (II) .015 N NaOH | 10.3 | 80 | 6.0 | 72 | 0.12 | 2 |

TABLE VI.—COMPARISON OF SINGLE AND TWO STEP EXTRACTION PROCEDURE FOR SOYBEAN FLOUR

| Method | Extract pH | Extract Percent of total N | Precipitate pH | Precipitate Percent of total N | Effluent Percent | Effluent Percent of total N |
|---|---|---|---|---|---|---|
| Single-step: | | | | | | |
| (I) .027 N NaOH | 10.2 | 75 | 4.5 | 64 | 0.66 | 10 |
| (I) H₂O (60° C.) | 6.5 | 55 | 4.5 | 45 | 0.51 | 8 |
| Two-step: | | | | | | |
| (I) H₂O (25° C.) | 6.5 | 36 | 4.0 | 30 | 0.39 | 6 |
| (II) .015 N NaOH | 10.6 | 44 | 5.5 | 40 | 0.12 | 4 |
| (I) .008 M CaCl₂ | 6.1 | 14 | 4.0 | 6 | 0.46 | 7 |
| (II) .015 N NaOH | 9.9 | 54 | 5.5 | 50 | 0.17 | 3 |

TABLE VII.—COMPARISON OF SINGLE AND TWO STEP EXTRACTION PROCEDURE FOR SUNFLOWER FLOUR

| Method | Extract pH | Extract Percent of total N | Precipitate pH | Precipitate Percent of total N | Effluent Percent | Effluent Percent of total N |
|---|---|---|---|---|---|---|
| Single-step: (I) .027 N NaOH | 9.6 | 66 | 4.5 | 56 | 0.63 | 10 |
| Two-step: | | | | | | |
| (I) H₂O | 6.5 | 13 | 4.0 | 8 | 0.30 | 4 |
| (II) .015 N NaOH | 9.4 | 51 | 6.0 | 45 | 0.26 | 5 |
| (I) .008 M CaCl₂ | 5.9 | 13 | 4.0 | 2 | 0.64 | 10 |
| (II) .015 N NaOH | 10.4 | 58 | 6.0 | 46 | 0.50 | 9 |
| Single-step: EtOH, extraction meal (I) .027 N NaOH | 10.6 | 57 | 5.0 | 48 | 0.73 | 7 |

The double extraction process offers, in addition to reduced effluent nitrogen and, with certain oilseeds, slightly higher yields, two isolates which differ in protein composition and characteristics. The preferred method of the two-step selective extraction procedure will depend upon the solubility characteristics of the constituent proteins and the membrane surrounding the protein bodies.

Having thus described our invention, we claim:

1. A process for extracting and recovering two separate protein fractions from cottonseed flour comprising the steps:

(a) mixing with agitation for a period of at least about thirty minutes and at a temperature within the range 25° C. to 75° C. cottonseed flour and water in a ratio by weight of about 1 to 15 to extract the water soluble protein fraction from the cottonseed flour.

(b) separating mechanically and retaining separately the water extracted flour and the water extract, (c) precipitating with acid and within the pH range 3.8 to 4.2 the protein in the water extract from step (b), (d) separating mechanically, washing and drying the protein precipitate from step (c) to recover the water extracted protein fraction from the cottonseed flour, (e) mixing with agitation for a period of at least about 30 minutes and at a temperature within the range 25° C. to 75° C. the water extracted flour from step (b) and an approximately .015 N aqueous sodium hydroxide in a ratio by weight of about 1 to 15 to extract the aqueous alkali soluble protein fraction from the water extracted cottonseed flour, (f) separating mechanically the aqueous sodium hydroxide extracted flour and the aqueous sodium hydroxide extract, (g) precipitating with acid and within the pH range 6.8 to 7.1 the protein in the aqueous sodium hydroxide extract from step (f), (h) separating mechanically, washing and drying the protein precipitate from step (g) to recover the aqueous sodium hydroxide extracted protein fraction from the cottonseed flour.

2. A process for extracting and recovering two separate protein fractions from cottonseed flour comprising the steps:
   (a) mixing with agitation for a period of at least about thirty minutes and at a temperature within the range 25° C. to 75° C. cottonseed flour and an approximately .008 M aqueous solution of polyvalent cationic salt in a ratio by weight of about 1 to 15 to extract the dilute aqueous salt solution soluble protein fraction from the cottonseed flour,
   (b) separating mechanically and retaining separately the aqueous salt solution extracted flour and the aqueous salt solution extract,
   (c) precipitating with acid and within the pH range 3.8 to 4.2 the protein in the aqueous salt solution extract from step (b),
   (d) separating mechanically, washing and drying the protein precipitate from step (c) to recover the aqueous salt solution extracted protein fraction from the cottonseed flour,
   (e) mixing with agitation for a period of at least 30 minutes and at a temperature within the range 25° C. to 75° C. the aqueous salt solution extracted flour from step (b) and an approximately .015 N aqueous sodium hydroxide in a ratio by weight of about 1 to 15 to extract alkali soluble protein fraction from the aqueous salt solution extracted cottonseed flour,
   (f) separating mechanically the aqueous sodium hydroxide extracted flour and the aqueous sodium hydroxide extract,
   (g) precipitating with acid and within the pH range 6.8 to 7.1 the protein in the aqueous sodium hydroxide extract from step (f),
   (h) separating mechanically, washing and drying the protein precipitate from step (g) to recover the aqueous sodium hydroxide extracted protein fraction from the cottonseed flour.

3. A process for extracting and recovering two separate protein fractions from cottonseed flour comprising the steps:
   (a) mixing with agitation for a period of at least thirty minutes and at a temperature within the range 25° C. to 75° C. cottonseed flour and an approximately .008 M aqueous salt solution selected from the group calcium chloride, calcium acetate, magnesium sulfate in a ratio by weight of about 1 to 15 to extract the aqueous salt solution soluble protein fraction from the cottonseed flour,
   (b) separating mechanically and retaining separately the aqueous salt solution extracted flour and the aqueous salt solution extract,
   (c) precipitating with acid and within the pH range 3.8 to 4.2 the protein in the aqueous salt solution extract from step (b),
   (d) separating mechanically, washing and drying the protein precipitate from step (c) to recover the aqueous salt solution extracted protein fraction from the cottonseed flour,
   (e) mixing with agitation for a period of at least about 30 minutes and at a temperature within the range 25° C. to 75° C. the aqueous salt solution extracted flour from step (b) and an approximately .015 N aqueous sodium hydroxide in a ratio by weight of about 1 to 15 to extract alkali soluble protein fraction from the aqueous salt solution extracted cottonseed flour,
   (f) separating mechanically the aqueous sodium hydroxide extracted flour and the aqueous sodium hydroxide extract,
   (g) precipitating with acid and within the pH range 6.8 to 7.1 the protein in the aqueous sodium hydroxide extract from step (f),
   (h) separating mechanically, washing and drying the protein precipitate from step (g) to recover the aqueous sodium hydroxide extracted protein fraction from the cottonseed flour.

4. The process of claim 3 wherein the salt solution is calcium chloride.

5. The process of claim 3 wherein the salt solution is calcium acetate.

6. The process of claim 3 wherein the salt solution is magnesium chloride.

7. The process of claim 3 wherein the salt solution is magnesium sulfate.

8. A process for extracting and recovering two separate protein fractions from soybean flour comprising the steps:
   (a) mixing with agitation for a period of at least about thirty minutes and at a temperature within the range 25° C. to 75° C. soybean flour and an approximately .008 M aqueous solution of a polyvalent cation salt in a ratio by weight of about 1 to 15 to extract the aqueous salt solution soluble protein fraction from the soybean flour,
   (b) separating mechanically and retaining separately the aqueous salt solution extracted flour and the aqueous salt solution extract,
   (c) precipitating with acid and within the pH range 3.8 to 4.2 the protein in the aqueous salt solution extract from step (b),
   (d) separating mechanically, washing and drying the protein precipitate from step (c) to recover the aqueous salt solution extracted protein fraction from the soybean flour,
   (e) mixing with agitation for a period of at least about 30 minutes and at a temperature within the range 25° C. to 75° C. the aqueous salt solution extracted flour from step (b) and .015 N aqueous sodium hydroxide in a ratio by weight of about 1 to 15 to extract alkali soluble protein fraction from the aqueous salt solution extracted soybean flour,
   (f) separating mechanically the aqueous sodium hydroxide extracted flour and the aqueous sodium hydroxide extract,
   (g) precipitating with acid and within the pH range 5.3 to 5.7 the protein in the aqueous sodium hydroxide extract from step (f),
   (h) separating mechanically, washing and drying the protein precipitate from step (g) to recover the aqueous sodium hydroxide extracted protein fraction from the soybean flour.

9. A process for extracting and recovering two separate protein fractions from soybean flour comprising the steps:
   (a) mixing with agitation for a period of at least about thirty minutes and at a temperature within the range 25° C. to 75° C. soybean flour and an approximately .008 M aqueous salt solution selected from the group calcium chloride, calcium acetate, magnesium chloride, and magnesium sulfate in a ratio by weight of about 1 to 15 to extract the aqueous salt solution soluble protein fraction from the soybean flour,
   (b) separating mechanically and retaining separately the aqueous salt solution extracted flour and the aqueous salt solution extract,
   (c) precipitating with acid and within the pH range 3.8 to 4.2 the protein in the aqueous salt solution extract from step (b),
   (d) separating mechanically, washing and drying the protein precipitate from step (c) to recover the aqueous salt solution extracted protein fraction from the soybean flour,
   (e) mixing with agitation for a period of at least about 30 minutes and at a temperature within the range 25° C. to 75° C. the aqueous salt solution extracted flour from step (b) and an approximately .015 N aqueous sodium hydroxide in a ratio by weight of about 1 to 15 to extract alkali soluble protein fraction from the aqueous salt solution extracted soybean flour, (f) separating mechanically the aqueous sodium hydroxide extracted flour and the aqueous sodium hydroxide extract, (g) precipitating with acid and within the pH range 5.3 to 5.7 the protein in the aqueous sodium hydroxide extract from step (f), (h) separating mechanically, washing and drying the protein precipitate from step (g) to recover the aqueous sodium hydroxide extracted protein fraction from the soybean flour.

10. The process of claim 9 wherein the salt solution is calcium chloride.

11. The process of claim 9 wherein the salt solution is calcium acetate.

12. The process of claim 9 wherein the salt solution is magnesium chloride.

13. The process of claim 9 wherein the salt solution is magnesium sulfate.

14. A process for extracting and recovering two separate protein fractions from peanut flour comprising the steps:
(a) mixing with agitation for a period of at least about 30 minutes and at a temperature within the range 25° C. to 75° C. peanut flour and an .008 M aqueous solution of a polyvalent cationic salt in a ratio by weight of about 1 to 15 to extract the aqueous salt solution soluble protein fraction from the peanut flour,
(b) separating mechanically and retaining separately the aqueous salt solution extracted flour and the aqueous salt solution extract,
(c) precipitating with acid and within the pH range 4.0 to 4.5 the protein in the aqueous salt solution extract from step (b),
(d) separating mechanically, washing and drying the protein precipitate from step (c) to recover the aqueous salt solution extracted protein fraction from the peanut flour,
(e) mixing with agitation for a period of at least about 30 minutes and at a temperature within the range 25° C. to 75° C. the aqueous salt solution extracted flour from step (b) and an approximately .015 N aqueous sodium hydroxide in a ratio by weight of about 1 to 15 to extract alkali soluble protein fraction from the aqueous salt solution extracted peanut flour,
(f) separating mechanically the aqueous sodium hydroxide extracted flour and the aqueous sodium hydroxide extract,
(g) precipitating with acid and within the pH range 5.7 to 6.2 the protein in the aqueous sodium hydroxide extract from step (f),
(h) separating mechanically, washing and drying the protein precipitate from step (g) to recover the aqueous sodium hydroxide extracted protein fraction from the peanut flour.

15. A process for extracting and recovering two separate protein fractions from peanut flour comprising the steps:
(a) mixing with agitation for a period of at least about thirty minutes and at a temperature within the range 25° C. to 75° C. peanut flour and an approximately .008 M aqueous salt solution selected from the group calcium chloride, calcium acetate, magnesium chloride and magnesium sulfate in a ratio by weight of about 1 to 15 to extract the aqueous salt solution soluble protein fraction from the peanut flour,
(b) separating mechanically and retaining separately the aqueous salt solution extracted flour and the aqueous salt solution extract,
(c) precipitating with acid and within the pH range 4.0 to 4.5 the protein in the aqueous salt solution extract from step (b),
(d) separating mechanically, washing and drying the protein precipitate from step (c) to recover the aqueous salt solution extracted protein fraction from the peanut flour,
(e) mixing with agitation for a period of at least about 30 minutes and at a temperature within the range 25° C. to 75° C. the aqueous salt solution extracted flour from step (b) and an approximately .015 N aqueous sodium hydroxide in a ratio by weight of about 1 to 15 to extract alkali soluble protein fraction from the aqueous salt solution extracted peanut flour,
(f) separating mechanically the aqueous sodium hydroxide extracted flour and the aqueous sodium hydroxide extract,
(g) precipitating with acid and within the pH range 5.7 to 6.2 the protein in the aqueous sodium hydroxide extract from step (f),
(h) separating mechanically, washing and drying the protein precipitate from step (g) to recover the aqueous sodium hydroxide extracted protein fraction from the peanut flour.

16. The process of claim 15 wherein the salt solution is calcium chloride.

17. The process of claim 15 wherein the salt solution is calcium acetate.

18. The process of claim 15 wherein the salt solution is magnesium chloride.

19. The process of claim 15 wherein the salt solution is magnesium sulfate.

20. A process for extracting and recovering two separate protein fractions from sunflower seed flour comprising the steps:
(a) mixing with agitation for a period of at least about thirty minutes and at a temperature within the range 25° C. to 75° C. sunflower seed flour and water in a ratio by weight of about 1 to 15 to extract the water soluble protein fraction from the sunflower seed flour,
(b) separating mechanically and retaining separately the water extracted flour and the water extract,
(c) precipitating with acid and within the pH range 3.8 to 4.2 the protein in the water extract from step (b),
(d) separating mechanically, washing and drying the protein precipitate from step (c) to recover the water extracted protein fraction,
(e) mixing with agitation for a period of at least about 30 minutes and at a temperature within the range 25° C. to 75° C. the water extracted flour from step (b) and an approximately .015 N aqueous sodium hydroxide in a ratio by weight of about 1 to 15 to extract the aqueous alkali soluble protein fraction from the water extracted sunflower seed flour,
(f) separating mechanically the aqueous sodium hydroxide extracted flour and the aqueous sodium hydroxide extract,
(g) precipitating with acid and within the pH range 5.3 to 6.0 the protein in the aqueous sodium hydroxide extract from step (f),
(h) separating mechanically, washing and drying the protein precipitate from step (g) to recover the aqueous sodium hydroxide extracted protein fraction from the sunflower seed flour.

21. A process for extracting and recovering two separate protein fractions from sunflower seed flour comprising the steps:
(a) mixing with agitation for a period of at least about thirty minutes and at a temperature within the range 25° C. to 75° C. sunflower seed flour and an approximately .008 M aqueous solution of a polyvalent cationic salt in a ratio by weight of about 1 to 15 to extract the aqueous salt solution soluble protein fraction from the sunflower seed flour,
(b) separating mechanically and retaining separately the aqueous salt solution extracted flour and the aqueous salt solution extract, (c) precipitating with acid and within the pH range 3.8 to 4.2 the protein in the aqueous salt solution extract from step (b), (d) separating mechanically, washing and drying the protein precipitate from step (c) to recover the aqueous salt solution extracted protein fraction from the sunflower seed flour, (e) mixing with agitation for a period of at least about 30 minutes and at a temperature within the range 25° C. to 75° C. the aqueous salt solution extracted flour from step (b) and an approximately .015 N aqueous sodium hydroxide in a ratio by weight of about 1 to 15 to extract alkali soluble protein fraction from the aqueous salt solution extracted sunflower seed flour, (f) separating mechanically the aqueous sodium hydroxide extracted flour and the aqueous sodium hydroxide extract, (g) precipitating with acid and withinn the pH range 5.3 to 6.0 the protein in the aqueous sodium hydroxide extract from step (f), (h) separating mechanically, washing and drying the protein precipitate from step (g) to recover the aqueous sodium hydroxide extracted protein fraction from the sunflower seed flour.

22. A process for extracting and recovering two separate protein fractions from sunflower seed flour comprising the steps:

(a) mixing with agitation for a period of at least about thirty minutes and at a temperature within the range 25° C. to 75° C. sunflower seed flour and an approximately .008 M aqueous salt solution selected from the group calcium chloride, calcium acetate, magnesium chloride and magnesium sulfate in a ratio by weight of about 1 to 15 to extract the aqueous salt solution soluble protein fraction from the sunflower seed flour, (b) separating mechanically and retaining separately the aqueous salt solution extracted flour and the aqueous salt solution extract, (c) precipitating with acid and within the pH range 3.8 to 4.2 the protein in the aqueous salt solution extract from step (b), (d) separating mechanically, washing and drying the protein precipitate from step (c) to recover the aqueous salt solution extracted protein fraction from the sunflower seed flour, (e) mixing with agitation for a period of at least about 30 minutes and at a temperature within the range 25° C. to 75° C. the aqueous salt solution extracted flour from step (b) and an approximately .015 N aqueous sodium hydroxide in a ratio by weight of about 1 to 15 to extract alakli soluble protein fraction from the aqueous salt solution extracted sunflower seed flour, (f) separating mechanically the aqueous sodium hydroxide extracted flour and the aqueous sodium hydroxide extract, (g) precipitating with acid and within the pH range 5.3 to 6.0 the protein in the aqueous sodium hydroxide extract from step (f), (h) separating mechanically, washing and drying the protein precipitate from step (g) to recover the aqueous sodium hydroxide extracted protein fraction from the sunflower seed flour, 23. The process of claim 22 wherein the salt solution is calcium chloride.

24. The process in claim 22 wherein the salt solution is calcium acetate.

25. The process of claim 22 wherein the salt solution is magnesium chloride.

26. The process of claim 22 wherein the salt solution is magnesium sulfate.

References Cited

UNITED STATES PATENTS

| | | | |
|---|---|---|---|
| 1,245,977 | 11/1917 | Saton | 260—123.5X |
| 2,194,835 | 3/1940 | Nickerson | 260—123.5 |
| 2,194,867 | 3/1940 | Olcott | 260—123.5 |
| 2,460,627 | 2/1949 | Erkko et al. | 260—123.5 |
| 2,462,933 | 3/1949 | Arthur et al. | 260—123.5X |
| 2,549,526 | 4/1951 | Rowe | 260—123.5 |
| 2,589,867 | 3/1952 | Rowe | 260—123.5 |
| 2,607,767 | 8/1952 | Vassel | 260—123.5 |

WILLIAM H. SHORT, Primary Examiner

H. SCHAIN, Assistant Examiner

U.S. Cl. X.R.

99—17